(12) United States Patent
Budaker et al.

(10) Patent No.: US 6,612,616 B2
(45) Date of Patent: Sep. 2, 2003

(54) ADJUSTABLE STEERING COLUMN SUPPORT

(75) Inventors: Martin Budaker, Heubach (DE); Gerhard Seitz, Schwäbisch Gmünd—Rechberg (DE); Günter Dieterle, Lorch (DE)

(73) Assignee: ZF Lenksysteme GmbH, Schwaebisch Gmuehd (DE)

( * ) Notice: Subject to any disclaimer, the term of this patent is extended or adjusted under 35 U.S.C. 154(b) by 0 days.

(21) Appl. No.: 10/056,732

(22) Filed: Jan. 25, 2002

(65) Prior Publication Data

US 2003/0098574 A1 May 29, 2003

(30) Foreign Application Priority Data

Nov. 28, 2001 (DE) .......................................... 101 58 308

(51) Int. Cl.⁷ .............................................. B62D 1/187
(52) U.S. Cl. .......................... 280/775; 74/493; 403/119
(58) Field of Search .................................. 280/775, 780; 74/493; 403/90, 119, 122, 132, 133

(56) References Cited

U.S. PATENT DOCUMENTS

| | | | | |
|---|---|---|---|---|
| 4,541,298 A | * | 9/1985 | Strutt .......................... | 280/775 |
| 5,306,032 A | * | 4/1994 | Hoblingre et al. .......... | 280/775 |
| 5,596,907 A | * | 1/1997 | Barton ........................ | 74/493 |
| 6,357,318 B1 | * | 3/2002 | Koellisch et al. ........... | 280/775 |
| 6,530,710 B1 | * | 3/2003 | Kuehbauch ................. | 403/133 |

FOREIGN PATENT DOCUMENTS

| | | | | |
|---|---|---|---|---|
| DE | 195 45 438 | | 6/1997 | |
| EP | 0 402 133 A1 | * | 12/1990 | ............ B62D/1/18 |

* cited by examiner

*Primary Examiner*—Peter C. English
(74) *Attorney, Agent, or Firm*—Kenyon & Kenyon

(57) ABSTRACT

A steering column support includes a bearing block with guide rail and a guide part for the steering column, the guide part having a slide section. A sliding block, sliding in the guide rail, is arranged between the slide section and guide rail. A high efficiency factor, inexpensive production and freedom from play may be ensured by the following features without reworking/adjustment: the sliding block is made of flexible material and is dimensioned such that it compensates for the play between the slide section and the guide rail; the slide section and the guide rail are made of sheet-steel molded parts; the sliding block is surrounded by one of the parts in such a way that an additional securing and retention in the longitudinal direction of the guide rail is dispensable; the slide section and the guide rail intermesh in such a way that a mutual emergency guidance without derailment remains, even if the sliding block is destroyed; and the sliding block is swing-mounted in the slide section.

4 Claims, 2 Drawing Sheets

ADJUSTABLE STEERING COLUMN SUPPORT

FIELD OF THE INVENTION

The present invention relates to an adjustable steering column support.

BACKGROUND INFORMATION

In the case of a steering column support on the market, a bearing block has a guide rail and is made of die-cast aluminum. A slide section is located on a guide part for the steering column and is made of sheet steel. Riveted to the slide section is a bolt which is used for the fixation of a sliding block which slides in the guide rail. Compensating disks to compensate for play are situated between the bolt and the sliding block. Namely, a steering column adjustable in height and/or in angle requires guidance free from play. Usually, this can also be implemented either by separate adjusting screws or by plastic guideways extending in machined surfaces.

Disadvantageous in both these concepts is that they cannot be manufactured in a play-free manner with justifiable expenditure of time and energy, and the adjustment by screws or compensating disks is also very costly, given high production quality.

Play in the steering column support leads to complaints, since the play is multiply transferred to the steering wheel. Therefore, very high expenditure of time and energy must be put forth here to keep the steering wheel radially free from play.

SUMMARY

An example embodiment of an adjustable steering column support according to the present invention, without mechanical processing and without adjusting screws or compensating disks, may ensure a high efficiency factor, inexpensive manufacture and freedom from play.

DETAILED DESCRIPTION

Figure 1:
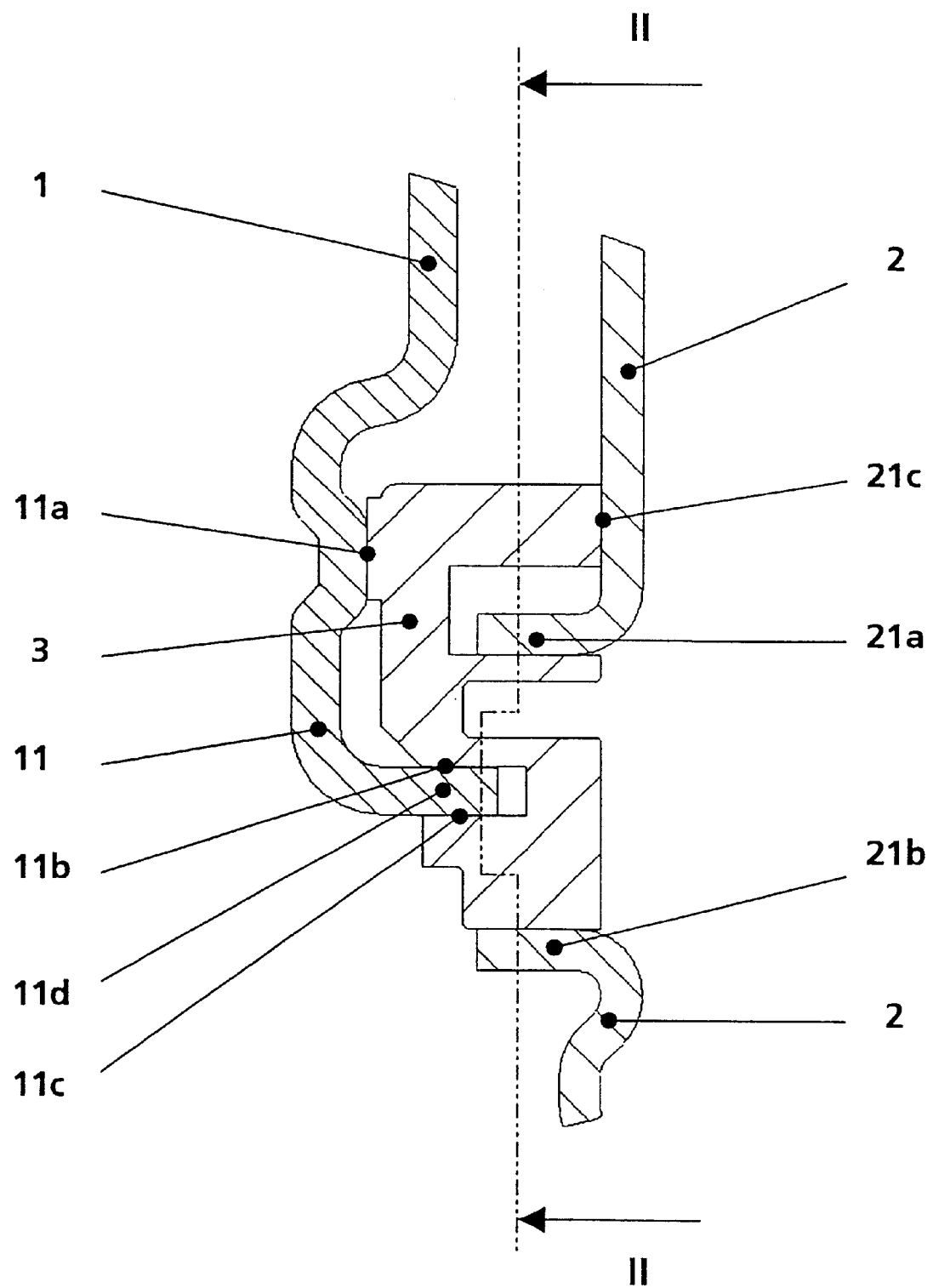
FIG. 1 is a schematic cross-sectional view of an intersection through parts relevant to the present invention, which is perpendicular to the longitudinal direction of a guide rail.
Figure 2:
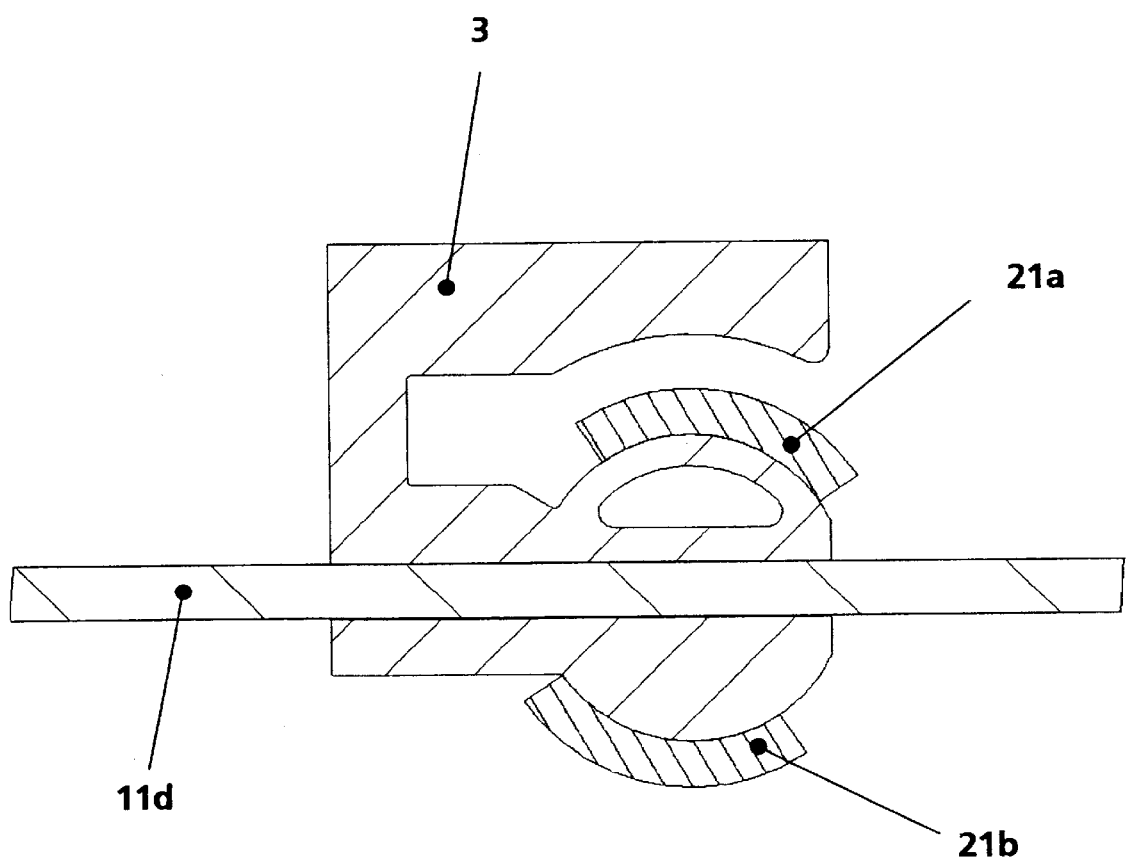
FIG. 2 is a schematic cross-sectional view of an intersection taken along the line II—II illustrated in FIG. 1.

A first part in the form of a bearing block 1 includes a guide rail 11. A second part in the form of a guide part 2 is used for accommodating a steering column. Guide rail 11 is used for guiding a slide section 21a, 21b, 21c of the second part, thus of guide part 2. Arranged between slide section 21a, 21b, 21c and guide rail 11 is an elastic sliding block 3 rotationally mounted in guide part 2 and gliding in the guide rail.

Sliding block 3 glides on sliding surfaces 11a, 11b, 11c of guide rail 11. Sliding surfaces 11b, 11c are located on mutually opposite surfaces of a shank lid of guide rail 11. Shank 11d is surrounded by sliding block 3.

A second arrangement corresponding to FIG. 1, but mirror-inverted, is provided on the other side of a mirror symmetry surface. Since the distance between a sliding surface 11a on one side and a corresponding sliding surface of the mirror image on the other side is tolerance-encumbered, and since the distance between a sliding surface 21c of slide section 21a, 21b, 21c on one side and a corresponding sliding surface of the mirror image on the other side is also tolerance-encumbered, the distance between 11a and 21c is tolerance-encumbered as well, so that it is necessary to compensate for deviations from the setpoint distance, thus of the play. Used for that purpose is elastic (plastic, self-lubricating) sliding block 3 which, at the same time, takes over the guidance of slide section 21a, 21b, 21c in guide rail 11.

Bearing block 1 and guide part 2 are molded parts made of sheet steel without subsequent processing. The construction is such that plastic sliding block 3 is surrounded by, in particular, force-transmitting sheet-metal part 2, namely, by its slide section 21a, 21b, 21c in such a way that it is possible to dispense with other securing and retention in the longitudinal direction of guide rail 11, and operation under emergency conditions is ensured, even in the event of a failure (destruction of plastic bearing block 3).

In addition, shanks 21a, 21b of slide section 21a, 21b, 21c surround sliding block 3 in such a way that slide section 21a, 21b, 21c is able to swivel with respect to sliding block 3, and thus with respect to guide rail 11. This permits an angular adjustment of guide part 2, and therefore of the steering column with respect to bearing block 1.

The adjustable steering column support according to the present invention may provided the following advantages:
1. Use of inexpensive sheet steel molded parts 1, 2
   Lower production costs compared to die casting
   No processing necessary
2. Omission of the hot riveting for a fixation bolt
   No bolt necessary any longer for mounting sliding block 3
   Bolt completely omitted
3. Omission of the adjustment
   No adjustment necessary because of flexibly designed sliding block 3
4. Freedom from play due to the spring action of sliding block 3
   Advantageous for the feel at the steering wheel
   No noise
   Offset or compensation against wear and tear.

What is claimed is:

1. An adjustable steering column support, comprising:
   a bearing block as a first part;
   a second part in the form of a guide part configured to receive a steering column, a first one of the first part and the second part including a guide rail configured to guide a sliding block which is secured to a slide section of a second one of the first part and the second part;
   wherein the sliding block is made of a flexibly compliant material and is dimensioned such that it compensates for play between the guide part and the guide rail;
   wherein the slide section and the guide rail are made of sheet-steel molded parts;
   wherein the sliding block is surrounded by one of the first part and the second part so that an additional securing and retention in the longitudinal direction of the guide rail is unnecessary;
   wherein the slide section and the guide rail are configured to intermesh so that a mutual emergency guidance without derailment remains, even if the sliding block is destroyed; and
   wherein the sliding block is mounted in the slide section such that the slide section can swivel with respect to the sliding block.

2. The adjustable steering column support according to claim 1, wherein the sliding block is made of plastic.

3. The adjustable steering column support according to claim 1, wherein at least one of the guide rail and the slide section is not reworked after it has been molded.

4. The adjustable steering column support according to claim 1, wherein the sliding block is made of a self-lubricating material.

* * * * *

UNITED STATES PATENT AND TRADEMARK OFFICE
CERTIFICATE OF CORRECTION

PATENT NO. : 6,612,616 B2
DATED : September 2, 2003
INVENTOR(S) : Budaker et al.

It is certified that error appears in the above-identified patent and that said Letters Patent is hereby corrected as shown below:

Column 1,
Line 61, after "shank" change "lid" to -- 11d --;

Column 2,
Line 8, after "self-lubricating" insert -- material --; and
Line 27, change "provided" to -- provide --.

Signed and Sealed this

Twenty-fourth Day of August, 2004

JON W. DUDAS
*Director of the United States Patent and Trademark Office*